United States Patent Office 2,907,664
Patented Oct. 6, 1959

2,907,664

SELF-SPRAYING WAX POLISH AND METHOD FOR ITS PRODUCTION

Daniel Schoenholz, Hollis, and Bernard Berkeley, Valley Stream, N.Y., assignors to Easy Glitter Wax Co., West Palm Beach, Fla., a copartnership of Hal Fulenwider, Jr., and Marion K. Fulenwider No Drawing. Application May 16, 1956
Serial No. 585,165

8 Claims. (Cl. 106—10)

This invention relates to a self-spraying wax polish composition and to a method for its production. More particularly, it relates to an emulsified, self-spraying wax polish composition containing a liquefied propellant gas under pressure and to a method for its production.

The usual paste wax polish is prepared by dissolving a wax or a mixture of waxes in a solvent, such as, for example, naphtha at an elevated temperature. The resulting solution is then cooled. Upon cooling, the wax comes out of solution and forms a matrix of crystals which entraps the solvent.

A wax polish which includes a liquefied propellant gas in its composition and which is self-spraying has been prepared by making up a composition similar to the usual paste wax composition, but containing a greater quantity of solvents and then adding a liquefied propellant gas. In this type of a polish composition, the bulk of the wax is present as a solid phase dispersed in solvent, since the solubility of waxes in the hydrocarbon solvents is generally low. The larger of the dispersed particles of wax in this composition have a tendency to grow at the expense of the smaller particles. Variations in temperature encourage this growth of the wax particle size. As a result, the wax in the composition has the undesirable tendencies of settling, caking and lumping. These tendencies result in a loss of the wax of the composition and causes mechanical difficulty arising from the lumps of wax plugging the valve through which the composition is sprayed.

Another disadvantage of this type of a self-spraying wax polish composition arises from the strong cooling effect, due to the rapid expansion of the liquefied propellant gas during the spraying of the composition. This cooling causes further insolubilization of the wax particles, and, as a result, relatively dry wax particles are deposited on the surface to be polished as a powdery film. Consequently, a significant proportion of the wax is inadvertently brushed off the surface during the buffing operation.

The preparation of self-spraying wax emulsions of the oil-in-water type which are intended for use as a floor polish and for the waxing of skis, respectively, has been disclosed by U.S. Patent 2,524,590, issued October 3, 1950, to Carsten F. Boe. The relatively high water content of these emulsions causes them to have several undesirable features. Among these features is an increased tendency to instability and an increased likelihood of corrosion of the container during storage. Further, the spray formed by the composition tends to be in the form of an undesirable foam, instead of in the form of droplets.

It is the object of this invention to provide a self-spraying wax polish which avoids the difficulties which have heretofore been encountered with such compositions, and which, even after prolonged storage, can be freely sprayed to produce a film which can be readily buffed to a high gloss.

A further object of this invention is to provide a self-spraying emulsified wax composition which is suitable for use as a shoe polish and for other uses for which the self-spraying emulsified compositions heretofore disclosed are unsuited, due to one or more of the defects noted hereinbefore.

Another object of this invention is to provide a self-spraying wax polish for leather which has an enhanced penetration of wax into the pores of the leather and has enhanced cleaning properties which eliminate the necessity for cleaning shoes before polishing them except where there is a great deal of soil on the shoes.

A further object of this invention is to provide a self-spraying shoe polish composition which forms a soft cake upon prolonged storage which can be readily redispersed merely by shaking the container and which, therefore, does not impair the usefulness of the composition.

Other objects and advantages of this invention will become apparent from the detailed description which follows.

The self-spraying polish composition, in accordance with this invention, is a water-in-oil type emulsion having a complex discontinuous phase, dispersed in a continuous phase of volatile organic solvent and a liquefied propellant gas. The continuous phase may contain a low concentration of dissolved wax. The dispersed phase consists of particles of a matrix of wax carrying entrapped organic solvent, which are surrounded by a layer or film of an aqueous solution of surface active agent. This emulsion may also carry a second dispersed phase and in its preferred form will have such a phase. This second disperse phase consists of droplets of an aqueous solution of surface active agent.

By the method in accordance with this invention, a solution of at least one wax in a volatile organic solvent and a solution of at least one surface active agent in water are prepared and adjusted to temperatures within the range above the temperature at which the wax or wax mixtures crystallize from the organic solvent solution and below the boiling point of the volatile organic solvent or of the aqueous solution of the surface active agent. The hot wax solution is then progressively and rapidly added to the hot aqueous solution of surface active agent, while the latter is being subjected to agitation, first to produce an emulsion of the oil-in-water type and then to cause this oil-in-water type of emulsion to undergo a phase inversion to a water-in-oil type emulsion. This water-in-oil type of emulsion has a continuous phase comprising the volatile organic solvent, which may contain a small percentage of dissolved wax. It has a disperse phase comprising droplets of a solution of wax in the volatile solvent surrounded by a film or layer of the aqueous solution of surface active agent. It may have a second disperse phase consisting of droplets of the solution of the surface active agent. The resulting hot, water-in-oil type of emulsion is then cooled to a temperature below that at which the wax or waxes crystallize from the solution in the organic solvent, while the agitation is being continued. During this cooling, the wax in the droplets of wax solution, surrounded by a film of the surface active agents, crystallizes to form a matrix carrying entrapped volatile solvent which is still surrounded by the film of the aqueous solution of the surface active agent. A liquefied propellant gas is then added under pressure to this cooled water-in-oil type emulsion and becomes a homogeneous part of its continuous phase. The liquefied propellant gas mixes with and forms a homogeneous part of the continuous phase of the emulsion.

The wax solution which we emulsify is prepared by heating a wax or a mixture of waxes with an organic solvent at an elevated temperature above the melting point of the wax mixture. The particular wax or wax mixture which is used is determined by the ultimate use for which the polish is intended and is the same as that used in conventional types of polishes intended for the same uses. Generally, we prefer to use a mixture of waxes, which may include ester type waxes, such as, candelilla wax, carnauba wax, beeswax, etc., hydrocarbon waxes, such as, the natural and synthetic paraffin waxes, and various other synthetic waxes. Similarly, the volatile organic solvent used in the preparation of this solution may be the same as that used in conventional paste waxes intended for the same ultimate uses. Hydrocarbon solvents are usually suitable for this purpose.

The surface active agent included in the aqueous solution used in the emulsion may be of the cationic, anionic or non-ionic types, and we have found that satisfactory emulsions can be prepared with many of the numerous surface active agents which are now available. Surface active agents of the non-ionic type which have been found to be of particular value in promoting the emulsification of the oil and water phases and for preventing coalescence of the dispersed phase in the final polish are the polyoxyethylene esters of fatty acids, the polyoxyethylene glycol esters of fatty acids, the polyoxyethylene sorbitan esters of fatty acids, the fatty amine condensates, the sorbitan fatty esters, the propylene glycol esters of fatty acids, the alkyl aryl polyether alcohols and the organic phosphate esters. Surface active agents of the anionic type which are similarly of particular value in these emulsions are the salts of fatty acids, the salts of alkyl aryl sulfonates, the salts of the fatty alcohol sulfates, the salts of the alkyl aryl polyether sulfonates, the salts of the sarcosinates and protein condensates.

We have found that the inclusion of an organic siloxane to our emulsified polish composition facilitates the buffing of the final wax film to a high gloss, increases the water repellence of the buffed wax film, and is advantageous in the prevention of foaming during the preparation of the emulsion. The organic siloxanes which are suitable for our purpose are polydialkyl siloxanes and polyalkyl aryl siloxanes, in which the alkyl or aryl groups, as the case may be, may be widely varied, and include the methyl, ethyl, propyl, phenyl and similar groups, as well as alkyl and aryl groups, in which one or more of the hydrogen atoms are replaced by halogens, nitrogen, phosphorous and sulfur derivatives, carboxyl groups and the like. We have found that the dimethyl polysiloxanes, the methyl ethyl polysiloxanes, the methyl phenyl siloxanes, the ethyl phenyl siloxanes and the diethyl siloxanes, having molecular weights with a relatively wide range are particularly useful for this purpose.

The organic siloxane utilized in our composition may originally be added either to the solution of wax in the volatile organic solvent or to the aqueous solution of the surface active agent, and we may include two or more different organic siloxanes in our composition. The same or different organic siloxanes may be included in the wax solution and in the aqueous solution of the surface active agent.

The liquefied propellant gas which forms an essential part of this composition may be, for example, dichlorodifluoromethane, difluoroethane, difluoropropylene, hexafluoropropylene, tetrafluoropropylene, trifluoroethane, pentafluoropropylene, tetrafluoroethane, pentafluoroethane, tetrafluoromethane, hexafluoroethane, isobutane, monochloropentafluoroethane, butane, monochloroheptafluoropropane, hexafluoropropane, propylfluoride, methyl-ethyl ether, monochloropentafluoropropylene, monochlorotrifluoropropylene, dichloromonofluoromethane or admixtures thereof. The liquefied propellant gas will be used in amount sufficient to propel substantially the entire quantity of the composition in a hermetically sealed vessel through a valve as a spray. In general, we have found that about 25% volume to about 75% by volume, and, preferably, about 50% by volume of the liquefied propellant gas in the finished composition causes it to spray satisfactorily at the usual ambient temperatures.

We have found that from the standpoint of convenience of operation it is preferable to prepare a water-in-oil emulsion which includes all the ingredients of the final composition, other than the liquefied propellant gas in relatively large batches and then add the liquefied propellant gas to this concentrated emulsion as it is charged into aerosol cans or other containers adapted for use with self-spraying compositions. The water-in-oil emulsion containing all its final ingredients, other than the liquefied propellant gas, will be referred to hereinafter as the "wax polish concentrate."

The wax polish concentrate can be conveniently prepared in commercial quantities by the use of two jacketed kettles of suitable capacity positioned one above the other and each provided with explosion-proof motor driven stirrers and sources for both steam and cold water for circulation through the jacket. In the preparation of the concentrate, the waxes of the composition are melted in the presence of the volatile organic solvent in the upper kettle to form the solution of wax which we emulsify. An organic polysiloxane may, if desired, be included in this solution. At the same time, an aqueous solution of the surface active agent, which may include an organic polysiloxane, is prepared with agitation and heating in the lower kettle. The temperature of each of these solutions is adjusted to be above the melting point of the waxes in the solution in the upper kettle and below the boiling point of either the volatile solvent in the upper kettle or the aqueous solution in the lower kettle. Volatile organic solvent is added to the upper kettle to compensate for the solvent lost by evaporation during the preparation of the solution and water is similarly added to the lower kettle to compensate for evaporation loss.

After these solutions have been made up, the solution of wax in the upper kettle is rapidly drained into the aqueous solution of surface active agents in the lower kettle, while the latter is being subjected to vigorous agitation. As the wax solution is added to the aqueous solution of surface active agents, it is emulsified as a disperse phase in an oil-in-water type of emulsion which first progressively increases in viscosity and then has a relatively constant viscosity during which a phase inversion of the emulsion occurs. In the case of the particular composition of Example I, given below, the viscosity of the emulsion increased steadily until about 56%, by volume, of the wax solution had been added to the aqueous solution, after which its viscosity remained constant until about 80%, by volume, of the wax solution had been added. Checks of the dispersibility of the emulsion in water and in oil, respectively, showed that the phase inversion in the emulsion took place when about 69%, by volume, of the wax solution had been added to the aqueous solution.

After all of the wax solution has been emulsified in the aqueous solution of the surface active agent, the emulsion is rapidly cooled to room temperature, while the vigorous agitation is continued. Additional volatile organic solvent is then added to the emulsion to compensate for losses due to evaporation. The resulting wax emulsion concentrate is then either immediately packaged in aerosol containers with the addition of a liquefied propellant gas or stored in a tightly sealed container for later admixture with a liquefied gas and packaging. It is desirable to thoroughly agitate the wax emulsion concentrate both immediately before and during the packaging operation.

This self-spraying wax emulsified wax composition is characterized both by its complex phase relationship and by its comparatively low water content. The water content of wax polish concentrate may be varied from about 0.5%, by weight, to about 35.0%, by weight, and, of course, falls within a lower range after the liquefied propellant gas is added to form the final composition.

We have found that the water content of the composition contributes to its advantageous properties and that about 25%, by weight, of the wax polish concentrate is an optimum percentage of water to give maximum buffability to the wax film laid down by the composition during its use, while giving a satisfactory film drying time.

As will be fully appreciated from the discussion of the ingredients which may be used in the formulation of the self-spraying wax compositions in accordance with this invention, a wide range of formulations may be used in the preparation of polishes for a single specific use, and, within the range of water content noted above, the proportions of the ingredients can be varied over a relatively wide range. Thus, we have found that we may vary the composition of the wax polish concentrate within the following ranges:

| Ingredient: | Range of concentration in percent by weight |
|---|---|
| Wax | About 0.25% to about 10.0% |
| Volatile organic solvent | About 30.0% to about 90.0% |
| Water | About 0.5% to about 35.0% |
| Emulsifiers | About 0.5% to about 13.0% |

An organic polysiloxane may be included in this composition in amount within the range of about 0.1 to about 5.0%, by weight. We have found that the optimum proportion of the organic polysiloxane is about 1.0%, by weight, with no apparent benefit produced by higher percentages.

The composition in accordance with this invention is self-spraying and is applied to a surface to be polished merely by opening the valve of a sealed container in which it is retained and directing the issuing spray over all parts of the surface. The liquefied propellant gas flashes off immediately and both the volatile organic solvent and the water dry out of the deposited wax film in a short time. The film of the composition is then buffed, as in the case of ordinary wax polishing compositions to polish the wax film to a high gloss. Residual water in this film materially reduces the buffing required to bring it to a high gloss.

Specific embodiments of the self-spraying, emulsified wax polish composition, in accordance with this invention, which are particularly adapted for use as shoe polishes, are illustrated by the examples which follow.

*Example I*

| Part A: | Parts by weight |
|---|---|
| Lanolin (U.S.P. anhydrous) | 0.62 |
| Candelilla wax, refined | 18.41 |
| Paraffin wax (S/V Product 2300) | 3.42 |
| Carnauba wax No. 3 | 3.86 |
| "Gersthofen OP" wax | 5.35 |
| Dimethyl siloxane (DC 200, 100 CS) | 6.22 |
| Naphthol mineral spirits | 125.25 |
| Part B: | |
| Neutral petroleum solvent (Sovasol No. 2) | 292.77 |
| Part C: | |
| Water | 157.77 |
| Borax | 1.24 |
| Stearic acid | 1.24 |
| Behenic acid | 2.49 |
| Protein condensate (Maypon OW) | 3.11 |
| Dimethyl siloxane (DC Antifoam A) | 0.01 |
| Part D: | |
| 28% aqueous ammonia | 1.24 |
| Total (Parts A, B, C, D) | 622.00 |

The "Gersthofen OP" wax is derived from montan wax and consists predominantly of esters of high molecular weight acids with alcohol. It can be described chemically as a mixture of the butylene glycol ester of montanic acid and calcium montanate. It has the following properties:

| | |
|---|---|
| Melting point °C | 102–106 |
| Acid number | 10–15 |
| Saponification number | 110–125 |
| Unsaponifiable percent | 7–10 |
| Specific gravity at 20° C. | 1.03–1.04 |

In the preparation of a wax emulsion concentrate from the above ingredients, the waxes and the solvent of Part A were melted together and adjusted to a temperature of 160° F. in the upper kettle of the equipment described hereinbefore. The ingredients of Part C were added to the lower kettle in the order listed and the mixture stirred at slow speed and heated until it became homogeneous. Its temperature was adjusted to 160° F. The temperature of Part B was adjusted to 150° F. and it was added to Part A, the wax solution, in the upper kettle along with sufficient naphthol mineral spirits to compensate for that lost by evaporation. Part D, the aqueous ammonia, is added at room temperature to the Part C, the aqueous solution of surface active agents, along with sufficient water to compensate for that lost by evaporation. The agitation of the aqueous solution in the lower kettle (Parts C and D) was speeded up and the contents of the upper kettle (Parts A and B) progressively and rapidly added thereto while the vigorous agitation was being continued. As soon as this addition was completed, the emulsion in the lower kettle was rapidly cooled to room temperature while the vigorous agitation was being continued. This completed, the wax polish concentrate was then packaged in aerosol cans with an equal volume of a 50–50 mixture of trichloro monofluoromethane (Freon 11) and dichloro difluoromethane (Freon 12).

*Example II*

| Aerosol can fill: | Percent by weight |
|---|---|
| Wax polish concentrate | 50.0 |
| Trichloro monofluoromethane (Freon 11) | 25.0 |
| Dichloro difluoromethane (Freon 12) | 25.0 |
| | 100.0 |

| Ingredients of wax polish concentrate: | |
|---|---|
| Ester type polishing waxes | 1.9 |
| Hydrocarbon wax | 0.6 |
| Naphtha solvent | 70.0 |
| Water | 25.2 |
| Emulsifiers— | |
| Amine soap | 0.6 |
| Protein condensate (Maypon OW) | 0.5 |
| Borax | 0.2 |
| Dimethyl siloxane | 1.0 |
| | 100.0 |

The amine soap used as an emulsifier in the foregoing composition may be the morpholine, the triethanolamine or the ammonium soap of stearic acid, behenic acid or oleic acid.

*Example III*

| Aqueous solution: | Percent by weight |
|---|---|
| Water | 25.7 |
| Borax | 0.2 |
| Stearic acid | 0.2 |
| Behenic acid | 0.4 |
| Aqueous ammonia 26° Bé. | 0.2 |
| Wax solution: | |
| Carnauba wax, refined | 1.7 |
| Paraffin wax (135°/137° F.) | 0.6 |
| Beeswax, yellow refined | 0.2 |
| Dimethyl siloxane (DC 200, 100 CS) | 1.0 |
| Naphthol spirits | 4.6 |
| Neutral petroleum solvent (Sovasol No. 2) | 65.2 |
| | 100.0 |

In the preparation of the wax polish concentrates from the foregoing ingredients, the temperature of the wax solution was adjusted to 180° F., and the aqueous solution, prior to the addition of the aqueous ammonia, was adjusted to a temperature of 160° F. after which the aqueous ammonia, at room temperature, was added just prior to the beginning of the emulsification step. The emulsification step was carried out as described in detail hereinbefore. The aerosol can fill composition is:

| | Percent by weight |
|---|---|
| Wax polish concentrate | 50.0 |
| Trichloro monofluoromethane (Freon 11) | 25.0 |
| Dichloro difluoromethane (Freon 12) | 25.0 |
| | 100.0 |

The complex phase relationship of the emulsified self-spraying wax polish composition, in accordance with this invention, has been demonstrated by dissolving an oil-soluble red dye in the solution of wax in organic solvent and a water-soluble blue dye in the aqueous solution of surface active agent from which it is prepared. The resulting emulsion was then stored until a separation of its phases occurred.

The lowest layer which separated from this emulsion was a blue aqueous layer formed by the separation of the emulsified droplets of the aqueous solution of the surface active agent, which formed one of the two disperse phases of the emulsion. Above this blue aqueous layer was a purple layer having a soft gel-like structure. This layer was formed by the agglomeration of the red droplets or particles of wax and solvent which carried an outer blue layer of the aqueous solution of surface active agent. The uppermost layer in the container was the clear red solution of wax in the organic solvents which formed the continuous phase of the emulsion.

This separated mixture was readily dispersed by agitation to a uniform emulsion having a purple color. This ready dispersion of the soft-gel-like purple layer of the separated mixture, as well as its color, and gel structure, demonstrated that one of the disperse phases of the emulsion consisted of discrete wax solvent droplets or particles surrounded by an aqueous layer of the surface active agent, since droplets or particles of wax and solvent not carrying a protective layer of an aqueous solution of surface active agent would have coalesced into a cake which would be difficult, if not impossible, to redisperse. The existing droplets of the aqueous solution of the surface active agent as a second disperse phase in this emulsion is demonstrated by the separation of the redispersible blue layer in the bottom of the container.

The emulsified form of this composition and, particularly, the complex nature of the disperse phase carrying the wax is responsible for a number of its advantageous properties, including its property of not irreversibly caking or lumping upon storage and the ease with which it can be redispersed after separation upon storage. The fact that the wax is largely dispersed in small particles surrounded by a layer of an aqueous solution of a surface active agent prevents the growth of the larger wax crystals at the expense of the smaller ones, thereby reducing the tendency of the emulsion to clog the spray nozzle and to sputter during spraying.

The water content of this composition is responsible for a number of other of its advantageous properties. As noted hereinbefore, the presence of water improves the buffability of the polish when applied to leather and permits the ready achievement of maximum gloss. In addition, the water content enhances the penetration of the wax into the pores of leather and improves the cleaning properties of the polish to an extent that eliminates the necessity of cleaning shoes before polishing them except when they carry a great deal of soil.

From the foregoing, it will be readily apparent to those skilled in the art that the characteristics of the products, in accordance with this invention, can be varied over a wide range by variations in the wax or wax mixtures, solvents and other ingredients of the compositions to adapt them for the polishing of a wide variety of different types of surfaces, including, in addition to leather, painted, varnished and lacquered surfaces, metal, wood, linoleum, vinyl, rubber and asphalt tile surfaces and many others. Thus, the specific examples of compositions in accordance with this invention, which are adapted for use in the polishing of shoes include no dye or pigment. It is obvious that a suitable dye or a pigment should be included in compositions which are intended to impart color to leather and it will be obvious to those skilled in the art that the percentage of dye or pigment should be based on the film-forming ingredients of the composition and, in general, be selected and incorporated into the wax as in the case of conventional shoe polishes.

While the wax polish composition, in accordance with this invention and the method by which it is produced, has been specifically exemplified in the foregoing, it will be understood that these examples are for the purpose of illustration and that various modifications and changes can be made from these examples without departing from the spirit of our invention and the scope of the following claims.

We claim:

1. A self-spraying wax polish composition consisting of an emulsion having a continuous phase comprising a liquefied propellant gas dissolved in a volatile organic solvent having a boiling point above normal room temperature and a disperse phase comprising particles including a wax and a volatile organic solvent having a boiling point above normal room temperature each of which are surrounded by a film of an aqueous solution containing surface active agent; the said emulsion having a water content within the range of about 0.5%, by weight, to about 35.0%, by weight, a wax content within the range of about 2.5%, by weight, to about 10%, by weight, a content of volatile, organic solvent within the range of about 30%, by weight, to about 90%, by weight, of the total weight of its ingredients other than the said liquified propellant gas, and an amount of the said liquified propellant gas within the range of about 25%, by volume, to about 75%, by volume, of the total volume of all other ingredients of the said emulsion.

2. A self-spraying wax polish composition consisting of an emulsion having a continuous phase comprising a solution of a liquefied propellant gas, a volatile organic solvent having a boiling point above normal room temperature and a small percentage of a wax, and a disperse phase comprising particles of a wax and a volatile organic solvent having a boiling point above normal room temperature, each of which are surrounded by a film of an aqueous solution of surface active agent; the said emulsion having a water content within the range of about 0.5%, by weight, to about 35.0%, by weight, a wax content within the range of about 2.5%, by weight, to about 10%, by weight, a content of volatile, organic solvent within the range of about 30%, by weight, to about 90%, by weight, of the total weight of its ingredients other than the said liquified propellant gas, and an amount of the said liquified propellant gas within the range of about 25%, by volume, to about 75%, by volume, of the total volume of all other ingredients of the said emulsion.

3. A self-spraying wax polish composition consisting of an emulsion having a continuous phase comprising a solution of a liquefied propellant gas, a volatile organic solvent having a boiling point above normal room temperature and a small percentage of a wax, a disperse phase consisting of particles including a wax and a volatile organic solvent each of which are surrounded by a film of an aqueous solution containing surface active agent, and a second disperse phase consisting of droplets of an aqueous solution containing surface active agent; the said emulsion having a water content within the range of about 0.5%, by weight, to about 35.0%, by weight, a wax content within the range of about 2.5%, by weight, to about 10%, by weight, a content of volatile, organic solvent within the range of about 30%, by weight, to about 90%, by weight, of the total weight of its ingredients other than the said liquified propellant gas, and an amount of the said liquified propellant gas within the range of about 25%, by volume, to about 75%, by volume, of the total volume of all other ingredients of the said emulsion.

4. A self-spraying polish composition consisting of an emulsion having a continuous phase comprising a solution of a liquefied propellant gas, a volatile organic solvent having a boiling point above normal room temperature, an organic polysiloxane selected from the group consisting of dimethyl polysiloxane, methyl ethyl polysiloxane, methyl phenyl polysiloxane and diethyl polysiloxane, and a disperse phase comprising particles of a wax matrix having entrapped therein a volatile organic solvent which has a boiling point above normal room temperature, each of which is surrounded by a film of an aqueous solution containing surface active agent; the said emulsion having a water content within the range of about 0.5%, by weight, to about 35.0%, by weight, a wax content within the range of about 2.5%, by weight, to about 10%, by weight, a content of volatile, organic solvent within the range of about 30%, by weight, to about 90%, by weight, of the total weight of its ingredients other than the said liquefied propellant gas, and an amount of the said liquefied propellant gas within the range of about 25%, by volume, to about 75%, by volume, of the total volume of all other ingredients of the said emulsion.

5. A self-spraying polish composition consisting of an emulsion having a continuous phase comprising a solution of a liquefied propellant gas, a volatile organic solvent having a boiling point above normal room temperature and a small percentage of wax dissolved therein, and a disperse phase comprising particles of a wax matrix containing at least two different waxes having entrapped therein a volatile organic solvent which has a boiling point above normal room temperature, each of which is surrounded by a film of an aqueous solution containing at least two surface active agents; the said emulsion having a water content within the range of about 0.5%, by weight, to about 35.0%, by weight, a wax content within the range of about 2.5%, by weight, to about 10%, by weight, a content of volatile, organic solvent within the range of about 30%, by weight, to about 90%, by weight, of the total weight of its ingredients other than the said liquefied propellant gas, and an amount of the said liquefied propellant gas within the range of about 25%, by volume, to about 75%, by volume, of the total volume of all other ingredients of the said emulsion.

6. A self-spraying polish composition consisting of an emulsion having a continuous phase comprising a solution of a liquefied propellant gas and a volatile organic solvent having a boiling point above normal room temperature and a disperse phase comprising particles of a wax matrix having entrapped therein a volatile organic solvent which has a boiling point above normal room temperature, each of which is surrounded by a film of an aqueous solution containing surface active agent, the said emulsion having a water content within the range of about 0.5%, by weight, to about 35.0%, by weight, a wax content within the range of about 2.5%, by weight, to about 10.0%, by weight, a content of a volatile organic solvent having a boiling point above normal room temperature within the range of about 30%, by weight, to about 90%, by weight, of the total weight of its ingredients other than the said liquefied propellant gas, and an amount of the said liquefied propellant gas within the range of about 25%, by volume, to about 75%, by volume, of the total volume of all other ingredients of the said emulsion.

7. The method for the production of a self-spraying wax polish composition, which includes the successive steps of adding a solution of a wax in a volatile organic solvent to an aqueous solution of surface active agent which is being vigorously agitated, while each of the said solutions is at a temperature above that at which the wax crystallizes from its said solution in the organic solvent and below the boiling point of the volatile organic solvent and of the aqueous solution of surface active agent, to produce an oil-in-water type emulsion and continuing the addition of solution of wax to cause the emulsion to undergo a phase inversion to a water-in-oil type of emulsion, cooling the resulting water-in-oil type of emulsion to a temperature below that at which the wax crystallizes from the solution in the volatile organic solvent, while continuing its agitation and adding to the emulsion a liquefied propellant gas while maintaining a super-atmospheric pressure on the emulsion.

8. The method for the production of a self-spraying wax polish composition, which includes the successive steps of adding a solution containing at least one wax in a volatile organic solvent to an aqueous solution containing at least one surface active agent which is being vigorously agitated, while each of the said solutions is at a temperature above that at which the wax crystallizes from its said solution in the organic solvent and below the boiling point of the volatile organic solvent, to produce an emulsion in which the aqueous solution of the surface active agent forms the continuous phase and the solution of the wax in a volatile organic solvent forms the disperse phase, continuing the addition of the hot wax solution to cause the emulsion to undergo a phase inversion to an emulsion in which the continuous phase is a dilute solution of wax in the said volatile organic solvent, a discontinuous phase consists of droplets comprising a core of wax dissolved in the volatile solvent surrounded by a film of an aqueous solution of surface active agent and a second disperse phase comprising droplets of an aqueous solution of surface active agent, cooling the said emulsion to a temperature below that at which the wax crystallizes out of its solution in the volatile organic solvent while continuing the agitation and adding to the emulsion a liquefied propellant gas while maintaining a super-atmospheric pressure on the emulsion.

References Cited in the file of this patent

UNITED STATES PATENTS

| | | |
|---|---|---|
| 1,949,857 | Braun | Mar. 6, 1934 |
| 2,015,943 | Loges | Oct. 1, 1935 |
| 2,071,027 | Dacus et al. | Feb. 16, 1937 |
| 2,167,438 | Kaufman | July 25, 1939 |
| 2,371,473 | Sanford | Mar. 13, 1945 |
| 2,524,590 | Boe | Oct. 31, 1950 |
| 2,584,413 | Baer et al. | Feb. 5, 1952 |
| 2,639,213 | Barth | May 19, 1953 |
| 2,669,524 | Mallander | Feb. 16, 1954 |
| 2,676,893 | Budner | Apr. 27, 1954 |

FOREIGN PATENTS

| | | |
|---|---|---|
| 691,448 | Great Britain | May 13, 1953 |